F. V. BARTLETT.
PRUNING TOOL.
APPLICATION FILED JUNE 19, 1913.
1,124,991.
Patented Jan. 12, 1915.
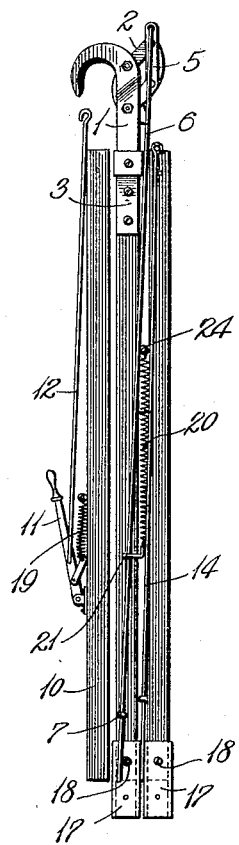
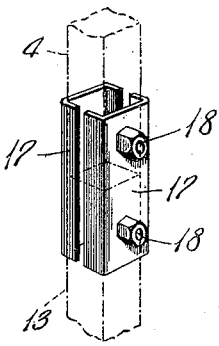
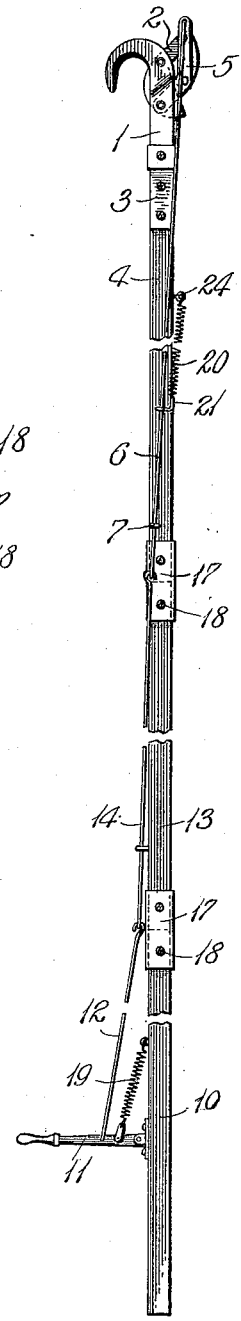
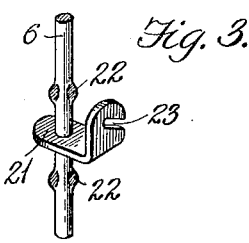
Witnesses
Chas. W. Stauffiger
Anna M. Dorr
Inventor
Frank V. Bartlett,
By
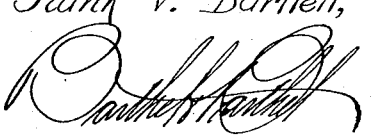
Attorneys

UNITED STATES PATENT OFFICE.

FRANK V. BARTLETT, OF DETROIT, MICHIGAN.

PRUNING-TOOL.

1,124,991.  Specification of Letters Patent.  Patented Jan. 12, 1915.

Application filed June 19, 1913. Serial No. 774,516.

*To all whom it may concern:*

Be it known that I, FRANK V. BARTLETT, a citizen of the United States of America, residing at Detroit, in the county of Wayne and State of Michigan, have invented certain new and useful Improvements in Pruning-Tools, of which the following is a specification, reference being had therein to the accompanying drawings.

This invention relates to a pruning tool and to an arrangement thereof whereby the latter may be adjusted to any length desired and whereby the cutting members or shears are operated with great facility and ease.

The invention consists in the matters hereinafter set forth and particularly pointed out in the appended claim.

In the drawing, Figure 1 is a view of a pruning tool that embodies the invention in extended or operative position; Fig. 2 is a view in detail of one form of joint connection; Fig. 3 is a view in detail of a guide for a connecting rod; and Fig. 4 is a view showing the tool in collapsed or telescoped position for transportation.

As herein shown in preferred form a pruning hook 1 of suitable design to coöperate with a shear hook or plate 2 that is hinged or fulcrumed thereon, is secured by a shank member 3 on one end of an upper pole section 4. A bell crank arm 5 that is operatively pivoted to the arm 2 may be oscillated by a connecting rod or member 6 that is of the same length as the section 4, suitable guides 7 being employed to maintain the rod in proper position. A lower handle bar 10 has an operating lever 11 pivoted thereon and provided with a connecting rod section 12. Intermediate sections such as shown at 13 carry intermediate rod sections 14 adapted to be hooked to the members 6 and 12. The sections are secured at the joints by any suitable means as for example, pairs of flange plates 17 that embrace the abutted ends of the sections and are held by clamping bolts 18 or the like. Obviously other forms of clamping means or holding means may be used. A suitably disposed spring 19 is used to return the handle 11 and the shear member of the hook to open position. Other springs as indicated at 20 may be used to assist if desired. In such latter construction an angle plate 21 is threaded on the connecting rod which is swaged or enlarged as indicated at 22 to secure it. An oblique slot 23 in the other arm of the angle plate is adapted to receive the hooked or eyeleted end of the spring 20, the other end thereof being attached to a screw eye 24 or the like on a pole section. As a result of this construction a pruning tool is obtained which is readily taken down for easy transportation and which is easily assembled for use. Any number of intermediate sections may be used to give the necessary length.

Obviously, changes in the details of construction may be made without departing from the spirit of my invention and I do not care to limit myself to any particular form or arrangement of parts.

What I claim is:—

In a pruning tool, the combination with a pole, a rod arranged longitudinally of said pole, and an operating lever carried by the lower end of said pole and connected to said rod, of a stationary hook carried by the upper end of said pole, a curved shear plate pivotally supported intermediate its ends by said stationary hook adjacent to the bill thereof and normally held in an open position with the cutting portion thereof in parallelism with a side of said pole, a bell crank having an end thereof in parallelism with the upper end of said shear plate extending between said pole and the cutting portion of said shear plate and pivotally connected to said pole and the opposite end thereof in a plane parallel with said pole and connected to said rod, and an arm pivotally connected to the end of said shear plate and to said bell crank intermediate the ends thereof and normally in substantial registration with the upper end of said bell crank whereby a downward movement of said rod closes said shear plate relatively to said stationary hook.

In testimony whereof I affix my signature in presence of two witnesses.

FRANK V. BARTLETT.

Witnesses:
OTTO F. BARTHEL,
ANNA M. DORR.